Sept. 23, 1941.　　　　T. ZOBEL　　　　2,256,855

SYSTEM FOR INVESTIGATING DENSITY FIELDS

Filed Nov. 7, 1939

Inventor

T. Zobel.

By Wallenstein & Groff

Attorneys.

Patented Sept. 23, 1941

2,256,855

UNITED STATES PATENT OFFICE 2,256,855

SYSTEM FOR INVESTIGATING DENSITY FIELDS

Theodor Zobel, Brunswick-Lehndorf, Germany, assignor to Luftfahrtforschungsanstalt Hermann Göring, Brunswick, Germany Application November 7, 1939, Serial No. 303,331
In Germany November 8, 1938

5 Claims. (Cl. 88—14)

This invention relates to optical arrangements and methods for examining the density of materials and test mediums in a qualitative and quantitative respect.

There are quite a number of physical processes in which a change of the density of transparent or translucent bodies can be rendered visible with the aid of the striae method of Toepler. This method briefly stated consists in that a bundle of light rays is passed through the density field or test medium to be examined and then directed upon a screen through an optical system including a condenser lens or a concave mirror, a stop member in the form of an edge being arranged at the focal point of the rays, so as to be just in contact with the bundle of rays at this point provided the rays pass through a medium having normal density, such as air. Now, if the density of the medium is different from that normal value, the bundle of light rays will be somewhat deflected, towards or away from the stop edge, depending on the refraction of the medium to be investigated, and the image of the light rays on the screen is thereby brightened or darkened, respectively. This method in many instances is satisfactory for a qualitative observation of the phenomena but, it does not permit a quantitative investigation of the phenomena to be examined. On the other hand, as is well known, the interference method in its various modifications is very suitable for such quantitative examinations. The interference method, briefly stated, consists in that a bundle of light rays is split up into two partial bundles of rays one of which passes through the medium to be investigated while the other ray is made to travel through a parallel path of exactly the same length, but without any test medium being arranged in this parallel path; the two partial rays are then re-united and made visible on a common screen. By suitable adjustment of mirrors in the light paths, it is now possible to produce interference strips the width and shape of which depend upon the density of the test medium and form a direct quantitative measure thereof. The striae and interference methods as combined in the present invention will be hereinafter described in greater detail.

In the physics of flow there is an ever increasing demand for rendering visible and exactly measuring the phenomena of flow. Where non-stationary short-timed phenomena, such as, explosion waves, sound phenomena in liquids and gases, formation of whirls in flows and local rapidly changing phenomena, such as flowing of gases and liquids around bodies of various kinds, are concerned, it is required to carry out accurate measurements simultaneously with the qualitative observation. Of course, it is possible to carry out the striae method and the interference method in time succession, but, this does not permit the measurement of non-stationary phenomena.

The present invention has for its object to render possible the simultaneous qualitative and quantitative measurement by combined application of both of the said methods.

In one special case (see Dr.-Ing. Theo Zobel "Erhöhung der Schneidgeschwindigkeiten beim Brennschneiden durch neue Düsenformen" VDI Verlag, Berlin, 1936) the interference method and the striae method have already been used simultaneously for the investigation of supersonic flows. However, in this case radial-symmetrical flows were concerned the structure of which could be investigated in the same manner by radioscoping in any direction perpendicularly to the axis of flow.

The invention, on the other hand, has for its object to render it possible to investigate density fields of any shape, and more particularly plane fields of any kind and dimensions simultaneously, i. e., in the same phase by means of the two said methods, without a mutual disturbance by the light rays of the two methods, and independently of the frequency of the phenomenon to be investigated.

According to the invention, this problem is solved in this manner that a bundle of light rays of a striae method is combined with the bundle of light rays of an interference method which passes through the density fields of the test medium to be investigated, and that the two bundles pass through the medium to be investigated in the same direction, together and simultaneously, while two different images of the phenomenon are afterwards produced on an image screen.

The interference method and the striae method of Toepler as well as the combined application of the two methods in accordance with the present invention will be better understood by reference to the following detailed description in connection with the accompanying drawing, showing schematically two arrangements for carrying out the invention and in which:

Fig. 1 is a schematic view of an arrangement involving the use of lenses while

Similar characters of reference denote similar parts in the two figures.

Figure 1:
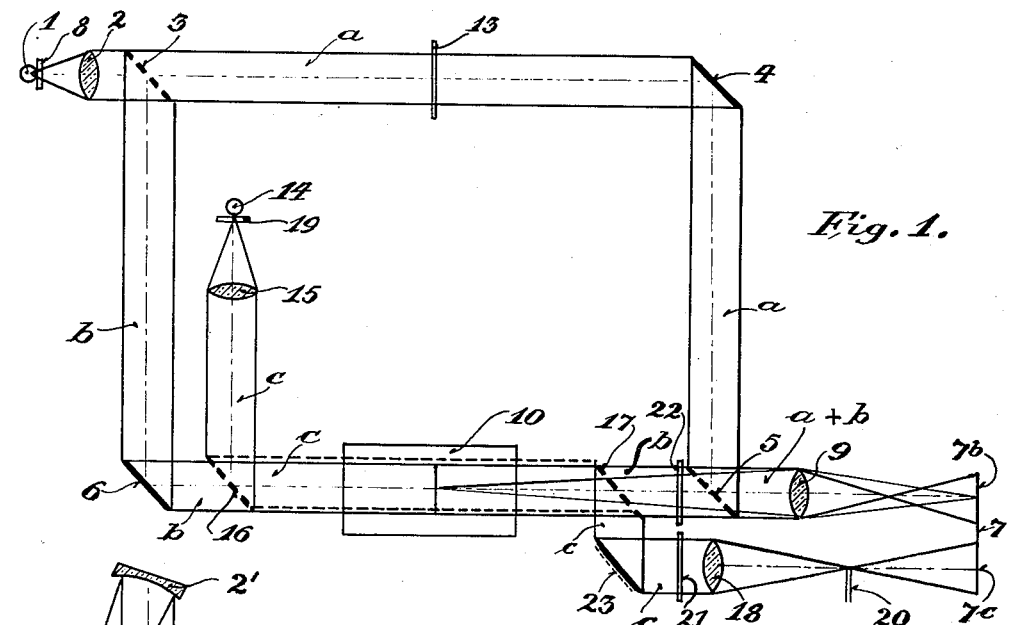
Figure 2:
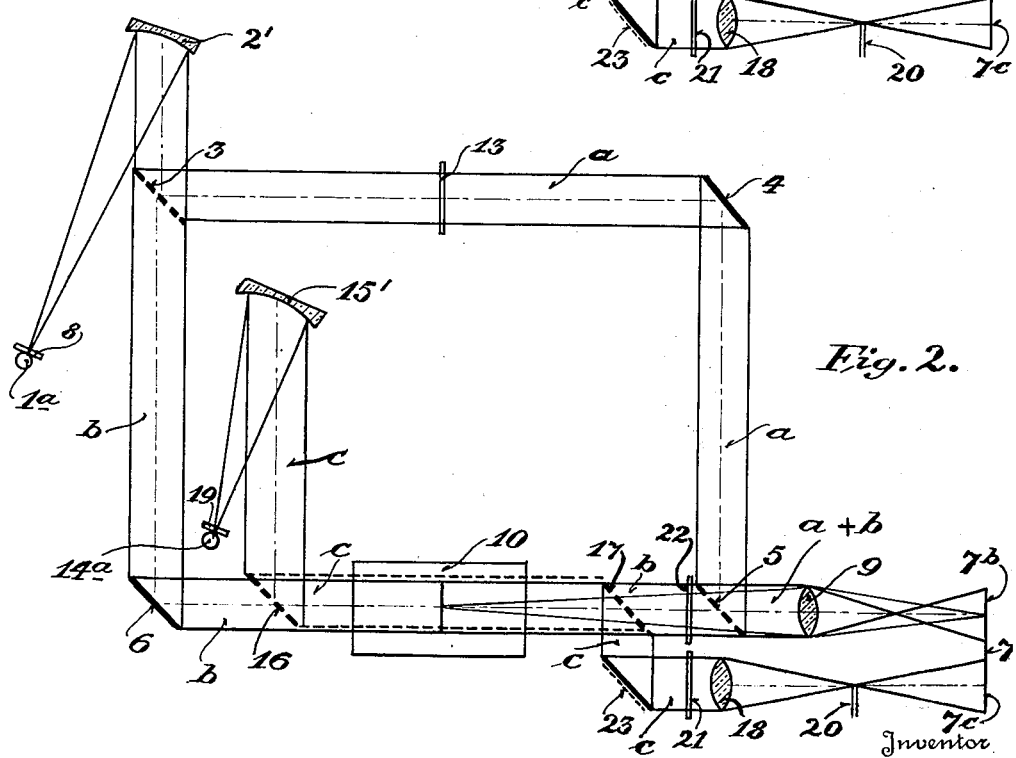
Fig. 2 is a similar view of an arrangement using concave mirrors instead of lenses.

Referring now to the drawing in greater detail, and first to the parts of the arrangement used for carrying out the interference method, it will be noted that the light radiated from a source of light 1 is converted into a pencil of parallel rays by a lens 2, Fig. 1, or by a concave mirror 2', Fig. 2, respectively, and directed to an interference system of four plates constituting plane mirrors 3, 4, 5, 6, of which mirrors 3 and 5 are semi-opaque and light transmitting, and 4 and 6 are opaque. A heat filter 8 has been interposed as indicated to prevent the heat rays of the source of light 1 from passing through the arrangement. The plate 3 as stated is a semi-opaque light-splitting mirror by which the pencil of rays is split up into two partial rays $a$ and $b$ of which ray $b$ is reflected by mirrors 3 and 6 to the semi-opaque light-splitting mirror 5 which permits passage of this ray $b$ to a screen 7, while the ray $a$ passes through the semi-opaque light-splitting mirror 3 and is reflected by the mirrors 4 and 5 to the screen 7 where the two partial rays $a$ and $b$ are combined, through a lens 9, to form a combined image.

Provided the four plates or mirrors 3, 4, 5, 6 are parallel, and the distances 3—4—5 and 3—6—5 are of the same length, it is possible to produce interference strips on the screen 7. The ray $b$ is caused to pass through the test medium 10 constituting the density field to be investigated. Its optical path is changed therein in accordance with the refraction power of the medium to be investigated. The change of the interference strips thereby effected forms a direct measure for the change of the density in the medium to be investigated.

Now, according to the present invention, in order to render the phenomenon visible by a striae method, in the same bundle of rays, the bundle of rays coming from the source of light 14 is combined with the interference ray, for example, with the aid of the semi-opaque light-splitting plates 16 and 17. It is advantageous to use a light source 14 having a wave length different from that of source 1, and to use light-splitting partly permeable plates 16 and 17, for the sake of a better yield of quantity of light. The interference ray $b$ leaving 17 is thus reduced in its intensity to 25 per cent. In order to match the interference ray $a$ to the same intensity, a glass plate 13 having a transmission power of 25 per cent is inserted in the path of the rays $a$ as a compensator.

The partial ray $c$ from light source 14 reflected from the plate 17 is used for the striae method in the usual manner and produces a striae image $7c$ of the phenomenon on the image screen 7, said image having the same size as the interference image $7b$ by the side of it. The partial ray from source 14 passing through the plate 17 is absorbed by a chromatic filter 22 which is impermeable or non-transparent with respect to the wave length of light source 14. A corresponding filter 21 which absorbs the remaining interference ray but permits passage of the striae ray may be also inserted in the striae ray after its separation from the interference ray, if desired.

By way of alternative, the parallel bundles of light required for the two aforesaid methods may be produced by concave mirrors 2' and 15' (Fig. 2) or similar means, instead of being produced by lenses. In order to avoid a disturbing radiation of heat rays, a thermal filter as 8 or 19 is inserted in front of each source of light.

It makes no difference which kind of interference method is used, but it is essential that the light ray of the striae method be combined with the interference ray while passing through the medium to be examined.

The light path of the ray passing through this medium is thus changed, as compared to a ray passing through a medium of uniform density and, as a result, the interference strips are displaced or bent, the amount of displacement or bending forming a direct measure for the density of the medium.

Referring now to the portion of the arrangement serving for the striae method of Toepler, illustrated in the same figures, it will be noted that a source of light 14 is disposed in the focal point of a lens 15, Fig. 1, or of a concave mirror 15', Fig. 2, thereby producing a parallel light ray $c$ which is projected through the mirrors 16 and 17 and a lens 18 upon the left hand portion $7c$ of screen 7.

Provided at the focal point between the lens 18 and the screen 7 is a unilateral stop member or notch 20 which is so adjusted as to just engage the light ray at the focal point if the same is unaffected by any particular density field.

Now, when the light ray is passed through the medium to be examined, the light ray is deflected, as has been explained, depending upon the refracting properties of the medium present, whereby more or less of the light ray is intercepted by the member 20 and, as a result, the image on screen 7 is brightened or darkened. In this manner flaws in the medium can be rendered visible.

While I have so far described the two parts of my novel apparatus or the two parts of my novel method as separate parts, it should be noted that the two parts make up a structural combination or a single process, respectively, thus permitting the simultaneous examination of a common density field by the striae and interference methods producing two juxtaposed images on the two portions $7b$ and $7c$ of a common screen 7.

By means of the optical arrangement just described it is possible to represent density fields of different kinds by both of the said optical methods at the same time and thereby to obtain an image of the process as well as the exact technical data for measurement of the same.

The apparatus may be constructed in this manner, that one partial ray of the two bundles of rays is used for the projection on a ground glass, while independently thereof the process may be recorded photographically or, in case of phenomena of a non-stationary character, it may be recorded cinematographically.

My novel method permits an accurate coordination of the results of the interference and striae methods, even in case of short-timed phenomena.

My novel method is of a particular importance for the examination of wings of aircrafts intended for high speed. The influence of the compressibility of the air becomes more and more important with respect to the flowing of the air around the wing profile as the flying speed is increased. As soon as the sound velocity is reached which in some instances may occur already on the wings of the now existing types of airplanes, at least in the form of local excessive speeds, the resistance and lift features and so the fundamental flying characteristics of the airplane are undergoing a fundamental change. In such cases the profile of the wings must be shaped according to principles which are quite different from those applying for the flying speeds now used. My novel device therefore permits especially the examination of high speed profiles and high speed flying bodies of various kinds in high speed aerodynamic investigating channels.

By the application of the said combined optical method it is possible to determine on the stationary wing, also during a change of the incidence angle, by each photographic exposure, the image of the flowing process (striae image) as well as the density field (interference image) and thus to ascertain the distribution of pressure around the whole profile of the wing. This simultaneous recording of the process renders it possible to recognize immediately the occurrence of local sound waves and to arrive at conclusions regarding the required changes of the profile, while the interference image obtained at the same time yields quantitative data regarding the change of lift produced by the sound waves.

It will be noted, that in the field of compressible flow the conventional means for the measurement in the air flow, such as, nozzles, Prandtl tubes, Pitot tubes, thermometers and the like cannot be used because sound waves would occur at any measuring device introduced into the flow and the measurement would be disturbed in an uncontrollable manner.

My novel method not only permits examination of the phenomena directly at the surface of the profile, as in the conventional measurements of the distribution of pressure by the provision of bores in the wing, but it is also possible to find out the conditions of the flow at any desired point in the surroundings of the profile whereby it is possible to examine the phenomena in the boundary layer and the thickness thereof.

Furthermore, all the essential phenomena of flow on auxiliary devices, such as auxiliary front wings, disturbing flaps, spreading flaps and fowler wings and the like can be examined.

The method and apparatus of the present invention have been described in detail with reference to specific embodiments. It is to be understood, however, that the invention is not limited by such specific reference but is broader in scope and capable of other embodiments than those specifically described and illustrated in the drawing.

I claim:

1. An optical arrangement for the simultaneous quantitative and qualitative investigation of density fields of a test medium, comprising first means for examining the density field by an interference method, said first means including means for producing a first pencil of parallel light rays, means for splitting up said light pencil into two partial light pencils respectively traversing two separate paths, one of which paths comprises the test medium, an image screen, means for re-uniting said partial light pencils on said image screen after passage through said separate paths, means for causing interference of the two re-united partial light pencils, second means for examining the density field by a striae method, said second means including means for producing a second pencil of parallel light rays, means for concentrating said second light pencil in a focal point, a unilateral optical stop member adapted to engage said second light pencil at its focal point, a second image screen, and means for directing said second light pencil on said second screen, after passage thereof past said stop member, and third means for permitting simultaneous investigation of a common density field by said first and second means, said third means including means for combining said second light pencil with the partial light pencil passing through the density field, and means for reseparating said second light pencil from said partial light pencil after common uni-directional passage through said density field, said two image screens being mounted in close juxtaposition.

2. An optical arrangement for the simultaneous quantitative and qualitative investigation of density fields of a test medium, comprising a first means for examining the density field by an interference method, said first means including means for producing a first pencil of parallel light rays, means for splitting up said light pencil into two partial light pencils respectively traversing two separate paths one of which paths comprises the test medium, an image screen, means for reuniting said partial light pencils on said image screen after passage through said separate paths, means for causing interference of the two re-united partial light pencils, a second means for examining the density field by a striae method, said second means including means for producing a second pencil of parallel light rays of a different wave length from said first light pencil, means for concentrating said second light pencil in a focal point, a unilateral optical stop member adapted to engage said second light pencil at its focal point, a second image screen, and means for directing said second light pencil on said second screen, after passage thereof past said stop member, and a third means for permitting simultaneous investigation of a common density field by said first and second means, said third means including means for combining said second light pencil with the partial light pencil passing through the density field, means including a chromatic filter for re-separating said second light pencil from said partial light pencil after common uni-directional passage through said density field, said two image screens being mounted in close juxtaposition.

3. An optical arrangement for the simultaneous quantitative and qualitative investigation of density fields, comprising first means for examining the density field by an interference method, said first means including means for producing a first pencil of parallel light rays, means including a semi-opaque mirror for splitting up said light pencil into two partial light pencils respectively traversing two separate paths one of which paths comprises the test medium, an image screen, means including opaque mirrors and semi-opaque mirrors for re-uniting said partial light pencils on said image screen after passage through said separate paths, means for causing interference of the two re-united partial light pencils, second means for examining the density field by a striae method, said second means including means for producing a second pencil of parallel light rays, means for concentrating said second light pencil in a focal point, a unilateral optical stop member adapted to engage said second light pencil at its focal point, a second image screen, and means for directing said second light pencil on said second screen, after passage thereof past said stop member, and third means for permitting simultaneous investigation of a common density field by said first and second means, said third means including a semi-opaque mirror for combining said second light pencil with the partial light pencil passing through the density field, and means for re-separating said second light pencil from said partial light pencil after common uni-directional passage through said density field, said two image screens being mounted in close juxtaposition.

4. An optical arrangement for the simultaneous quantitative and qualitative investigation of density fields, comprising first means for examining the density field by an interference method, said first means including means for producing a first pencil of parallel light rays, means including a half-permeable mirror for splitting up said light light pencil into two partial light pencils respectively traversing two separate paths one of which paths comprises the test medium, means in the path of the other partial ray for compensating for the influence of the semi-opaque mirrors upon the light intensity of the light pencil passing through the test medium, an image screen, means including opaque mirrors and semi-opaque mirrors for re-uniting said partial light pencils on said image screen after passage through said separate paths, means for causing interference of the two re-united partial light pencils, second means for examining the density field by a striae method, said second means including means for producing a second pencil of parallel light rays, means for concentrating said second light pencil in a focal point, a unilateral optical stop member adapted to engage said second light pencil at its focal point, a second image screen, and means for directing said second light pencil on said second screen, after passage thereof past said stop member, and third means for permitting simultaneous investigation of a common density field by said first and second means, said third means including a semi-opaque mirror for combining said second light pencil with the partial light pencil passing through the density field, and means for reseparating said second light pencil from said partial light pencil after common uni-directional passage through said density field, said two image screens being mounted in close juxtaposition.

5. In a method for the quantitative and qualitative investigation of density fields of a test medium, the steps which comprise producing a first pencil of parallel light rays, splitting up said light pencil into two partial light pencils, passing a testing one of said partial light pencils through the test medium, re-uniting said partial light pencils and causing interference thereof on an image screen after passage through separate paths of equal geometrical length, producing a second pencil of parallel light rays, combining said second light pencil with the testing partial light pencil, for common uni-directional passage through said test medium, re-separating said second light pencil from said partial light pencil, concentrating the second light pencil in a focal point and directing it past a unilateral optical stop member engaging the light pencil at said focal point, and directing the second light pencil on said image screen to produce an image in close juxtaposition to that of the first light pencil.

THEODOR ZOBEL.